C. CIMARIK.
PLOW.
APPLICATION FILED DEC. 5, 1910.
1,002,966.
Patented Sept. 12, 1911.
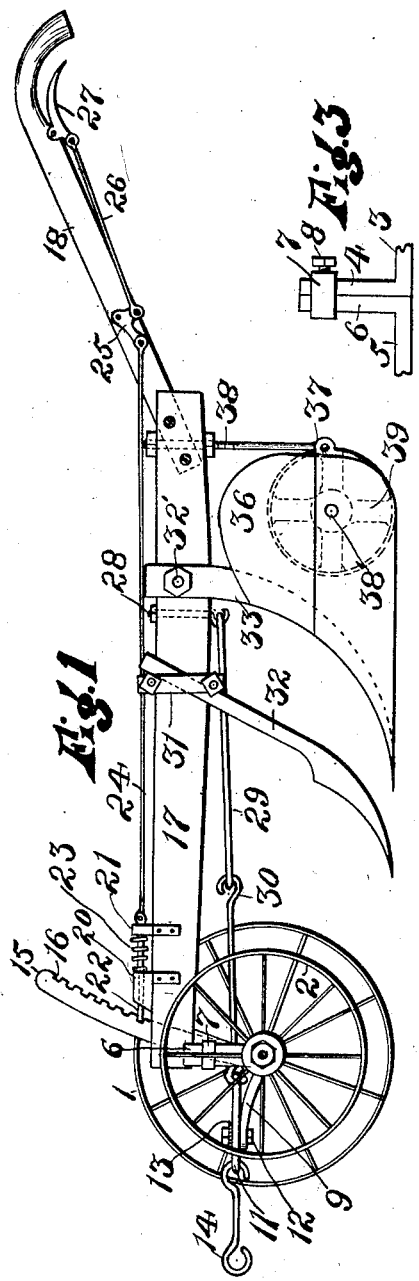
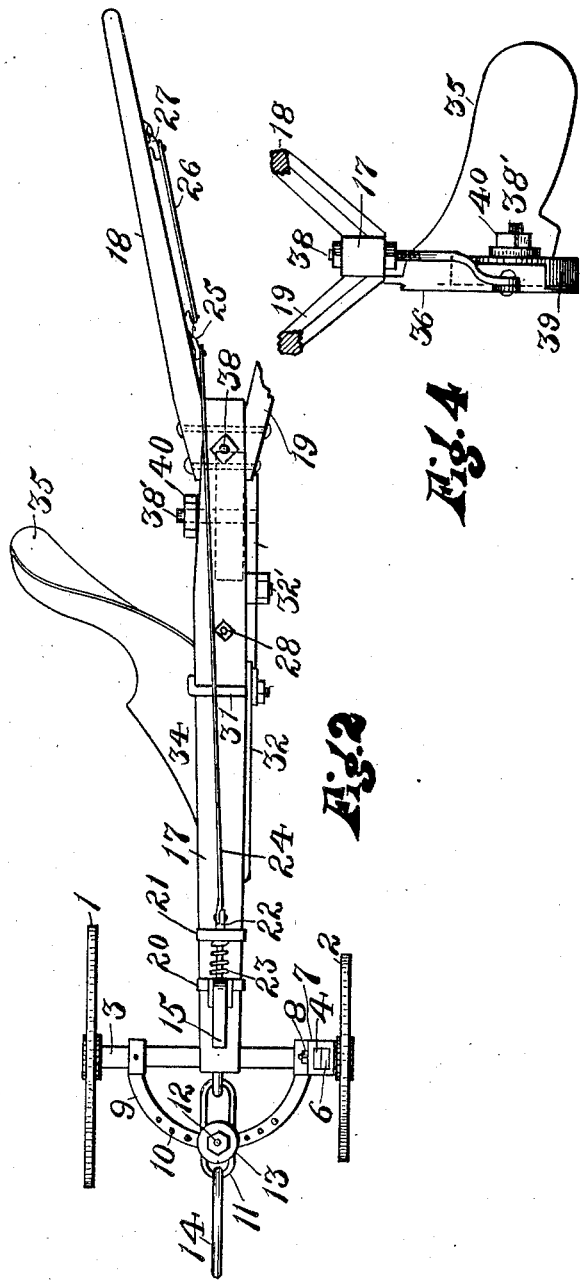
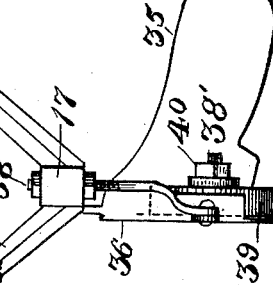
Witnesses:
Trace B. Humphrey
Glenara Fox
INVENTOR—
Charles Cimarik,
BY C. E. Humphrey
ATTORNEY.

UNITED STATES PATENT OFFICE.

CHARLES CIMARIK, OF AKRON, OHIO.

PLOW.

1,002,966.   Specification of Letters Patent.   Patented Sept. 12, 1911.

Application filed December 5, 1910. Serial No. 595,777.

*To all whom it may concern:*

Be it known that I, CHARLES CIMARIK, a subject of Peter I, King of Servia, residing at Akron, in the county of Summit and State of Ohio, have invented new and useful Improvements in Plows, of which the following is a specification.

This invention relates to improvements in plows and a principal object thereof is to provide a plow which when used requires a minimum amount of labor on the part of the user or operator thereof.

The invention contemplates providing a truck for supporting the front end of the beam of the plow, the truck embodying supporting ground wheels and provided with means for adjustably holding the front end of the plow-beam for the purpose of imparting different inclinations thereto for regulating the depth of the furrow made by the plow or for causing the latter to dig the furrow deeper or shallower as desired. At the same time by providing means for adjusting the position of the front end of the beam the corresponding inclination of the plow may be so changed as to cause it to leave the ground at the will of the user.

The invention further contemplates providing a wheel or roller positioned approximately rearwardly of the mold-board of the plow and covered by a shield positioned to keep the earth from interfering with the same so that when the plow is in use under service conditions the wheel or roller constitutes an element for reducing the drag of the same. The wheel or roller is also extremely useful in the transportation of the plow from point to point when the same is not in actual use.

A further object of the invention is to provide means whereby the draft is applied approximately centrally of the beam permitting the portion of the beam in advance of the point of draft to be inclined to cause or produce a change in direction of the furrow as desired, the draft means and the forward truck of the plow being connected and adjustable horizontally in respect to each other.

A further object is to provide a plow having ready means for adjusting the inclination of the beam thereof, under control of the user or operator of the same and which will be positive in action, simple in construction and durable in use, and further possessing novel means for increasing the effectiveness of the same in use.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claim hereunto appended.

In the drawings in which similar reference numerals indicate like parts in the different figures: Figure 1 is a view in side elevation of a plow embodying this invention, with one of the plow handles omitted. Fig. 2 is a plan, with one of the plow handles broken away. Fig. 3 is a view in side elevation of a portion of the axle of the truck for supporting the front end of the plow, and Fig. 4 is a view in rear elevation of the device shown in Fig. 1, looking from the right thereof, with a portion of the mechanism omitted.

Referring to the drawings the reference numerals 1 and 2 designate respectively large and small ground wheels both provided with hubs, and adapted to run at all times approximately parallel to each other.

The ground wheel 1 is mounted on the outer end of a horizontal axle-forming member 3, having at its opposite end an upwardly-extending arm 4. The ground wheel 2 is mounted on a similar horizontal axle-forming member 5 having an upturned arm 6 arranged in lapping engagement with the up-turned member 4 of the member 3, and the members 4 and 6 are held in adjusted position with respect to each other by means of a collar 7 provided with a set screw 8 for holding the latter in position. This arrangement permits the vertical shifting of the member 6 with respect to the member 4 and consequently a change of position of the axle-forming member 5 and wheel 2 with respect to the axle-forming member 3 and the ground wheel 1 for a purpose which will be later described.

Secured to the axle-forming member 3 is a member 9, the ends of which are preferably looped to receive and be secured to the member 3 and with the intermediate portion segment-shaped and provided with a plurality of spaced apertures 10. Engaging the segment-shaped member 9 is a link 11 held in a predetermined position by means of a bolt 12 passing through one of the apertures 10 and provided with a washer 13 for clamping the link against movement. Connected with front end of the link 11 is a hook 14 adapted to be attached to a whiffletree for drawing the plow.

On the axle-forming member 3 is connected the lower end of a curved bar or standard 15, the curvature of which is approximately the arc of a circle and is provided on its rear face with a plurality of notches 16.

The plow body of this device embodies a beam 17 provided at its front end with a vertical opening to receive the curved bar 15 and is further provided at its rear end with a pair of divergent handles 18. Mounted preferably on the upper face of the forward end of the beam 17 are two bearings 20 and 21 in which is shiftably mounted a bolt 22 positioned to engage in the notches 16 and normally held in locking engagement with said bar 15 by means of a coiled spring 23. Secured to the rear end of the bolt 22 is a rod 24 having its opposite end connected with a bell-crank lever 25 preferably positioned on the inner face of the handle 18. Secured to the other leg of the bell-crank 25 is a rod 26, the other end of which is connected with a trigger 27 positioned adjacent to the curved portion of handle 18 to be easily manipulated by the user of the plow when guiding the latter. Near the central portion of the beam 17 is a hook-bolt 28 to which is connected a link 29, the opposite end of which is connected by means of a link 30 with link 11, so that the pull of the team on the hook 14 will be transmitted directly to the hook-bolt 28 near the central portion of the beam 17.

Positioned somewhat in advance of the eye-bolt 28 is a clamp 31 for holding a colter 32, but as this is ordinarily constructed a further description of the same is believed to be unnecessary. Held by means of a bolt 32' to the side of the beam 17 is a standard 33 for sustaining the plow body which comprises a plow-share 34 and a mold-board 35, but as these may be of any preferred construction a detailed description thereof is believed to be unnecessary. Secured on the standard 33 or the plow body as desired is a casing 36 hereinafter called a shield and forming a hollow box-like structure projecting rearwardly from the plow point but substantially on the opposite side of the beam 17 and its rear portion is curvilinearly formed and preferably provided with an apertured ear 37 to which is connected a supporting bolt 38 depending from the rear portion of the beam 17. Revolubly mounted on a horizontal shaft 38' on the shield 36 is a wheel 39 held in position on the shaft 38' by means of a nut 40. The size of the wheel is such that when the periphery of the latter is on the ground and the mechanism adjusted as shown in Fig. 1 of the drawings the point of the plow will be approximately flush with the ground line.

In use the large ground wheel 1 is adapted to run in the furrow and the wheel 2 on the surface of the unplowed ground. The jointed axles for the two wheels are adjusted by means of the sleeve 7 to keep them substantially horizontal. The line of draft is adjusted by shifting the position of bolt 12 in the segment-shaped member 9 and clamping it in position as has been already described. The inclination of the plow beam and plow is adjusted to cause the latter to dig deeper or shallower, as desired, by releasing the locking-bolt 22 through the medium of the trigger 27 and connected mechanism after which the position of the beam and plow is changed by raising or lowering the handles 18 and 19, causing the plow and beam to swing on the shaft 38' as a pivot and as the bar 15 is concentric with said shaft it offers no resistance to the free movement of the front end of the plow beam. When in a desired position the trigger is released and the bolt 22 locks the beam in place.

In transporting the plow when not in use the wheel 39 sustains the weight of the same and renders the movement thereof comparatively easy.

I claim:

The combination with a plow beam having near its front end a vertical opening therein and rearwardly-projecting handles, a plow supported below the rear end of said beam, a horizontal axle secured immediately in the rear of the digging portion of said plow, a ground-wheel mounted on said axle, a ground-wheel positioned near the front end of said plow, an axle for said ground-wheel, an upwardly-extending bar mounted on said axle projecting through the opening in said beam, the upper portion of said bar curved in the arc of a circle of which the axle on said plow is the center, said curved portion of said bar provided in its rear portion with a plurality of notches and locking means on said beam for engaging said notches for holding the front end of said beam in an adjusted position when said beam is tilted on said rear axle as a pivot substantially as described.

In testimony whereof I have hereunto set my hand in presence of two subscribing witnesses.

CHARLES CIMARIK.

Witnesses:
  C. E. HAIDET,
  C. E. HUMPHREY.

Copies of this patent may be obtained for five cents each, by addressing the "Commissioner of Patents, Washington, D. C."